United States Patent
Priem (10) Patent No.: US 8,463,951 B1
(45) Date of Patent: Jun. 11, 2013

(54) UNIFIED DRIVER ARCHITECTURE DEVICE IDENTIFIER STRATEGY

(75) Inventor: Curtis R. Priem, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 212 days.

(21) Appl. No.: 10/811,397

(22) Filed: Mar. 25, 2004
(Under 37 CFR 1.47)

Related U.S. Application Data (60) Provisional application No. 60/458,781, filed on Mar. 27, 2003.

(51) Int. Cl.
*G06F 3/00* (2006.01)
(52) U.S. Cl.
USPC ...................................... 710/10; 710/8; 713/2
(58) Field of Classification Search
USPC ......................................... 710/8, 10; 713/1, 2
See application file for complete search history.

(56) References Cited

U.S. PATENT DOCUMENTS

| | | | | |
|---|---|---|---|---|
| 5,630,076 A * | 5/1997 | Saulpaugh et al. | ............ | 710/104 |
| 5,870,610 A * | 2/1999 | Beyda | ............................ | 717/173 |
| 5,923,897 A * | 7/1999 | Lipe et al. | .......................... | 710/5 |
| 5,948,076 A * | 9/1999 | Anubolu et al. | ................... | 710/8 |
| 5,951,684 A * | 9/1999 | Jeon | ................................... | 713/1 |
| 6,009,480 A * | 12/1999 | Pleso | ................................ | 710/8 |
| 6,023,585 A * | 2/2000 | Perlman et al. | ................ | 717/178 |
| 6,263,387 B1 * | 7/2001 | Chrabaszcz | .................... | 710/302 |
| 6,336,152 B1 * | 1/2002 | Richman et al. | ................... | 710/8 |
| 6,496,893 B1 * | 12/2002 | Arai | ............................... | 710/302 |
| 6,728,787 B1 * | 4/2004 | Leigh | ............................. | 719/327 |
| 6,804,774 B1 * | 10/2004 | Larvoire et al. | .................... | 713/2 |
| 6,832,278 B2 * | 12/2004 | Oshins et al. | ................. | 710/104 |
| 6,892,381 B2 * | 5/2005 | Kim et al. | ...................... | 717/171 |
| 6,915,514 B1 * | 7/2005 | Machida | ........................ | 717/174 |
| 6,931,593 B1 * | 8/2005 | Grooters | ........................ | 715/717 |
| 6,965,953 B2 * | 11/2005 | Kujirai | ............................ | 710/62 |
| 6,996,706 B1 * | 2/2006 | Madden et al. | .................... | 713/2 |
| 7,058,811 B2 * | 6/2006 | Spain et al. | .................... | 713/176 |
| 7,237,101 B1 * | 6/2007 | Dono et al. | ......................... | 713/1 |
| 7,287,257 B2 * | 10/2007 | Meza | ............................. | 719/321 |

(Continued)

OTHER PUBLICATIONS

Don Anderson/Tom Shanley, Card Bus System Architecture, 1996, MindShare, Inc.second, 261-265.*
Tom Shanley et al., "PCI System Architecture", Fourth Edition, MindShare, Inc., Addison-Wesley, 1999, pp. 351-367 and 378-385.
"PCI Configuration Space," Wikipedia.org, Feb. 17, 2012, pp. 1-5.

*Primary Examiner* — Ernest Unelus (57) ABSTRACT

Embodiments of the present invention provide for initializing a device for use in a computer system. In one embodiment a BIOS routine reads a configuration register of each device in a computer system. The configuration register contains a device identifier indicating an oldest version of a device driver for controlling the device. The device identifier for each device is saved in a configuration data space. An operating system retrieves each device identifier contained in the configuration data space, and maps each device identifier to a corresponding device driver utilizing a registry. The operating system loads and causes execution of an initialization routine of each corresponding device driver mapped to each of the device identifiers.

11 Claims, 11 Drawing Sheets

U.S. PATENT DOCUMENTS

| | | | |
|---|---|---|---|
| 2002/0069353 A1* | 6/2002 | Smith | 713/1 |
| 2002/0133694 A1* | 9/2002 | Ray et al. | 713/1 |
| 2002/0161939 A1* | 10/2002 | Kim et al. | 710/8 |
| 2002/0170951 A1* | 11/2002 | Oshins et al. | 235/375 |
| 2003/0051069 A1* | 3/2003 | Iida | 709/321 |
| 2003/0126421 A1* | 7/2003 | Nalawadi et al. | 713/1 |
| 2003/0145191 A1* | 7/2003 | Park | 713/1 |
| 2003/0167354 A1* | 9/2003 | Peppers et al. | 709/327 |
| 2004/0073912 A1* | 4/2004 | Meza | 719/321 |
| 2007/0220192 A1* | 9/2007 | Okamoto et al. | 710/301 |

\* cited by examiner

| BYTE | | | |
|---|---|---|---|
| 3 | 2 | 1 | 0 |

| | | | |
|---|---|---|---|
| DEVICE ID | | VENDOR ID | |
| STATUS REGISTER | | COMMAND REGISTER | |
| CLASS CODE | | | REVISION ID |
| BIST | HEADER TYPE | LATENCY TIMER | CACHE LINE SIZE |
| BASE ADDRESS 0 | | | |
| BASE ADDRESS 1 | | | |
| BASE ADDRESS 2 | | | |
| BASE ADDRESS 3 | | | |
| BASE ADDRESS 4 | | | |
| BASE ADDRESS 5 | | | |
| CARDBUS CIS POINTER | | | |
| SUBSYSTEM ID | | SUBSYSTEM VENDOR ID | |
| EXPANSION ROM BASE ADDRESS | | | |
| RESERVED | | | CAPABILITIES POINTER |
| RESERVED | | | |
| MAX_LAT | MIN_GNT | INTERRUPT PIN | INTERRUPT LINE |

FIGURE 6

CONFIGURATION DATA STRUCTURE

| VENDOR ID | DEVICE ID |
|---|---|
| A | 01 |
| B | 02 |
| D | 10 |

BC REMOVED
BE ADDED
DA ADDED

REGISTRY

| VENDOR ID | DEVICE ID | DRIVER |
|---|---|---|
| A | 01 | A01 |
| B | 01 | B01 |
| B | 02 | B03 |
| B | 03 | B03 |
| C | 01 | C01 |
| C | 02 | C02 |

FIGURE 7A

| CONFIGURATION DATA STRUCTURE | |
| --- | --- |
| VENDOR ID | DEVICE ID |
| A | 01 |
| B | 02 |
| D | 10 |

| REGISTRY | | |
| --- | --- | --- |
| VENDOR ID | DEVICE ID | DRIVER |
| A | 01 | A01 |
| B | 01 | B01 |
| B | 02 | B05 |
| B | 03 | B05 |
| B | 04 | B05 |
| B | 05 | B05 |
| C | 01 | C02 |
| C | 02 | C02 |
| D | 10 | D10 |

UPDATE DRIVER FOR DEVICE BE

FIGURE 7B

CONFIGURATION DATA STRUCTURE

| VENDOR ID | DEVICE ID |
|---|---|
| A | 01 |
| B | 02 |
| B | 02 |
| C | 02 |
| D | 10 |

BG ADDED → (row B 02)
CB ADDED → (row C 02)

REGISTRY

| VENDOR ID | DEVICE ID | DRIVER |
|---|---|---|
| A | 01 | A01 |
| B | 01 | B01 |
| B | 02 | B05 |
| B | 03 | B05 |
| B | 04 | B05 |
| B | 05 | B05 |
| C | 01 | C02 |
| C | 02 | C02 |
| D | 10 | D10 |

FIGURE 7C

UNIFIED DRIVER ARCHITECTURE DEVICE IDENTIFIER STRATEGY

CROSS REFERENCE TO RELATED APPLICATION

This application claims the benefit of U.S. Provisional Application No. 60/458,781 filed Mar. 27, 2003 entitled "Unified Driver Architecture Device Identifier Strategy", by PRIEM, Curtis, R.

BACKGROUND OF THE INVENTION

Figure 1:
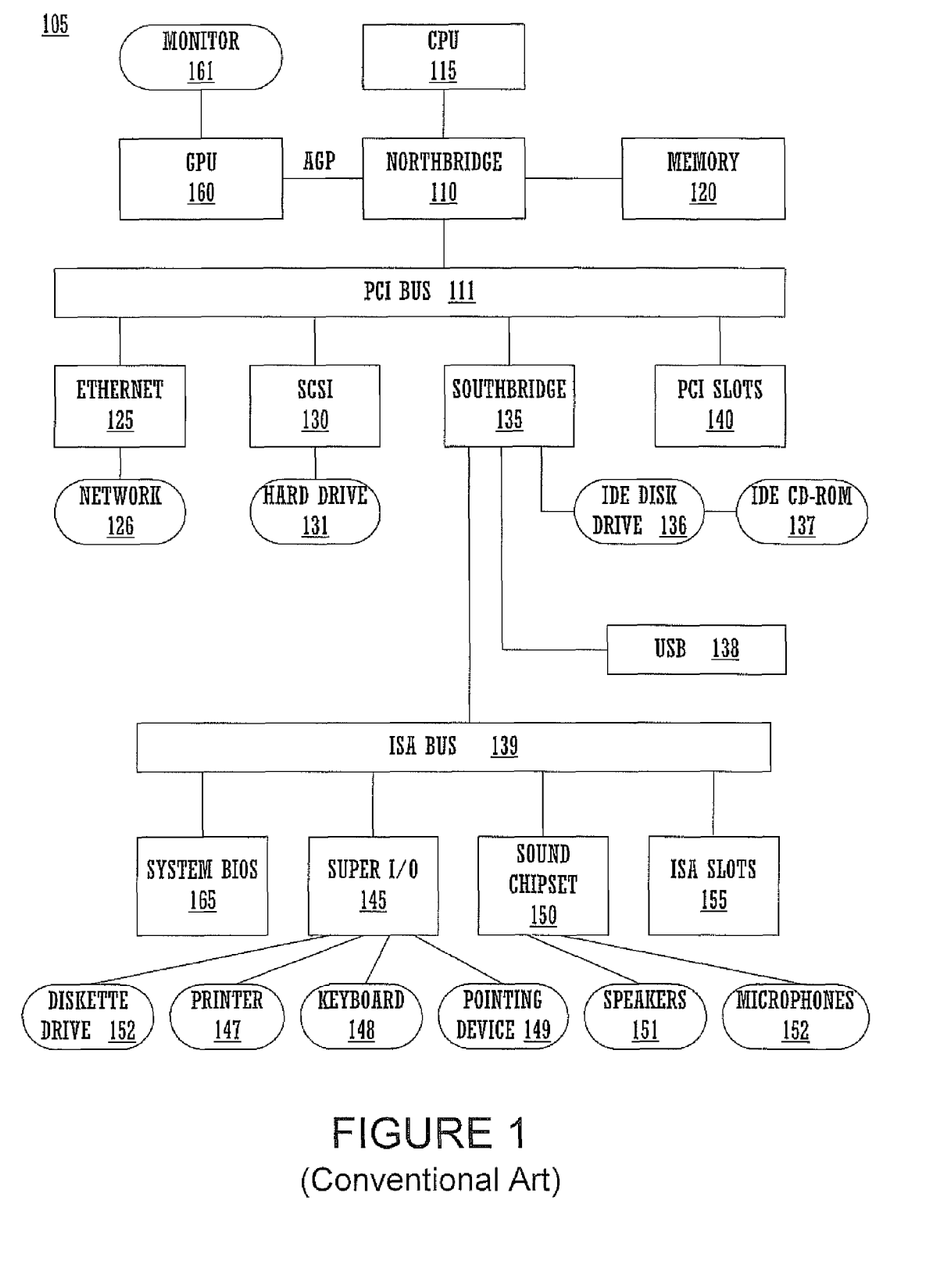
FIG. 1 shows an exemplary computer system according to the conventional art.

Referring to FIG. 1, an exemplary computer system 105 according to the conventional art is shown. As depicted in FIG. 1, the computer system 105 comprises a northbridge 110 chip set. A processor 115 is coupled to the northbridge 110 for processing addresses, data, and instructions. A computer-readable memory 120 (e.g. random access memory, and/or the like) for storing addresses, data and/or instructions is also coupled to the north bridge 110. The computer system 105 also includes various system and periphery devices 125-165 coupled to the northbridge 110. The north bridge 110 acts as a simple input/output hub for communicating addresses, data and instructions between the processor 115, computer-readable memory 120, and/or the various system and periphery devices 125-165.

Certain functionality, processes, steps, and/or benefits implemented by the computer system 105 are realized as a series of instructions (e.g. software program) that resides within the computer-readable memory 120 and are executed by the processor 115. Such instructions may also be read into the processor 115 from another computer-readable medium (e.g., 126, 131, 136, 137, 146, 165). The terms "computer-readable memory" and "computer-readable medium" as used herein refers to any medium that participates in providing instructions to the processor 115 for execution. Such a medium may take many forms, including, but not limited to, firmware, flash memory, random access memory, floppy disks, magnetic disk, CD-ROMs, DVDs, memory cards, transmission medium, and/or the like. Furthermore, various forms of computer-readable medium may be involved in carrying one or more sequences of one or more instructions to the processor 115 for execution.

When the computer is first powered on, the processor executes a basic input/output system (BIOS) routine. The BIOS is stored in a system BIOS 165 (e.g. computer-readable medium such firmware, flash memory, and/or the like). The BIOS is a set of essential software routines that test hardware at startup, starts the operating system, and supports the transfer of data among system and periphery devices 110-165. The BIOS includes a separate bus-specific program called a bus enumerator, to determine what devices exist and what configuration requirements each device has. The bus enumerator however, does not enable the devices.

The BIOS passes a list of all the devices that the computer has to work with, as determined by the bus enumerator, when it boots the operating system. The operating system loads one or more applicable drivers from a mass storage device type of computer-readable memory (e.g., 131, 136, 137, 146) into the system type computer-readable memory 120. The particular drivers loaded are based upon a plurality of mappings contained in a registry (also known as a system registry, initialization file, configuration file, or the like). As each applicable driver is loaded, the operating system causes execution of each driver's initialization code, thereby enabling the device.

Figure 2A:
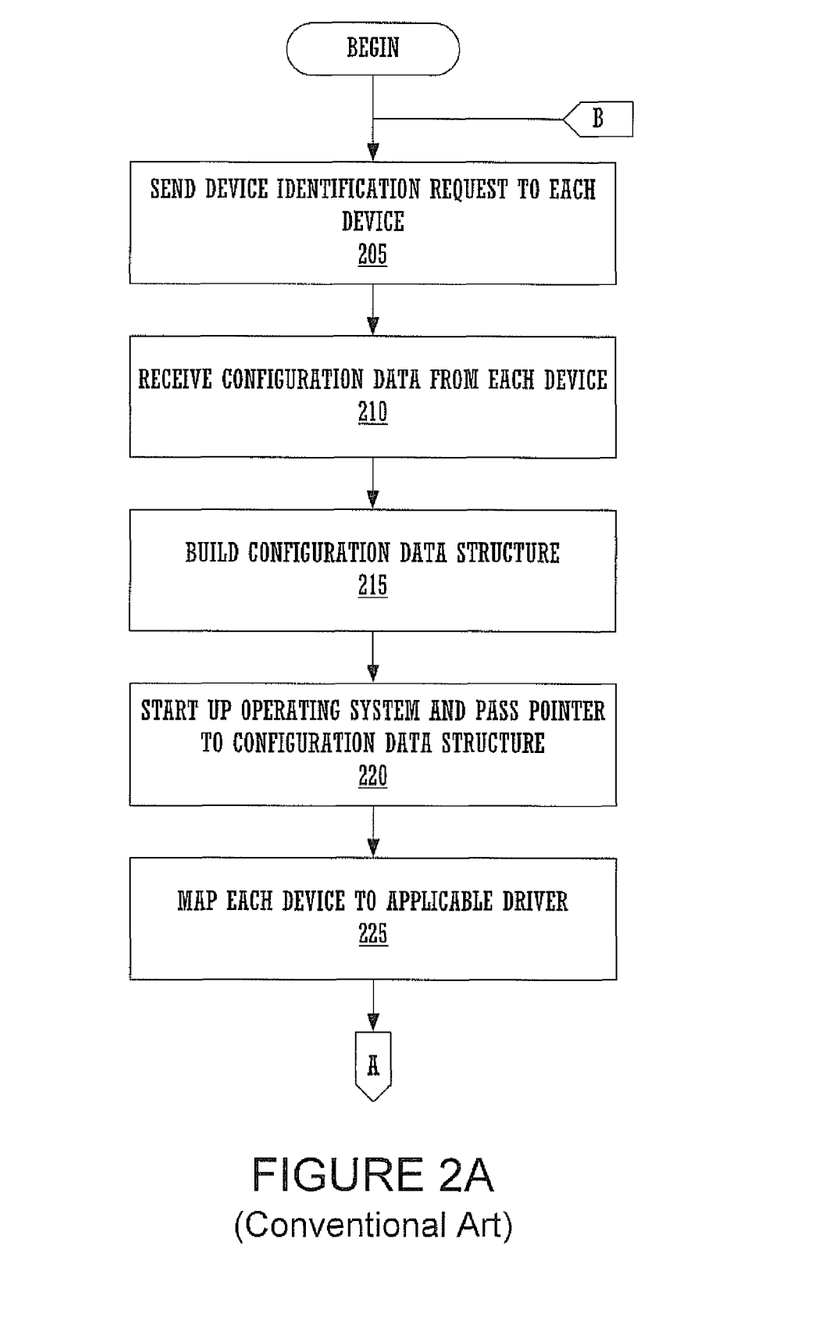
FIGS. 2A-2B show a flow diagram of a method of initializing a plurality of hardware devices according to the conventional art.
Figure 2B:
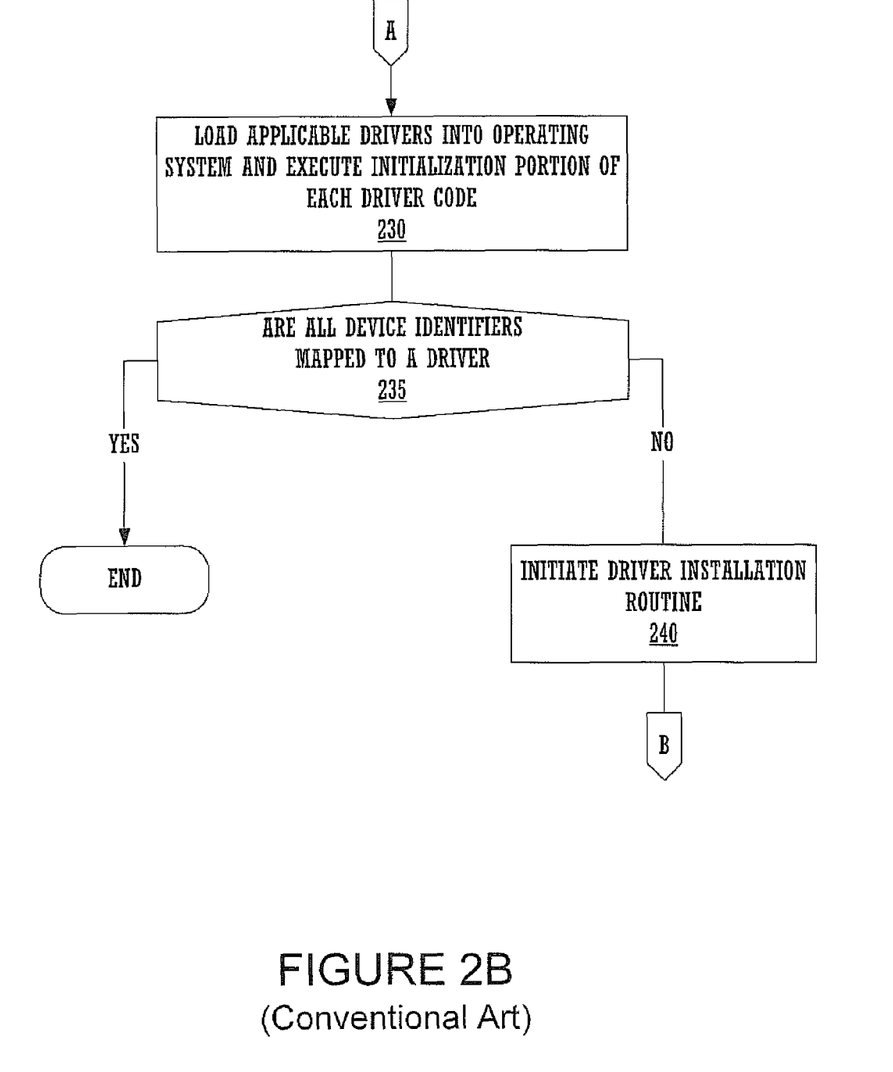

Referring now to FIGS. 2A-2B, a flow diagram of a method of initializing a plurality of hardware devices according to the conventional art is shown. As depicted in FIGS. 2A-2B, the bus enumerator routine sends a query to each device on a respective bus, at step 205. The query causes each device present to return configuration data, at step 210. The configuration data is contained in a plurality of configuration registers of each attached device. The configuration data comprises a device identifier and is utilized to map the device to a corresponding driver that provides for operation of the device.

The bus enumerator routine stores the received configuration data in memory, at step 215. Thereafter, the operating system is booted. A memory location pointer, to the configuration data, is passed to the operating system at start up, at step 220. The operating system then utilizes a registry (e.g., registry, system registry, initialization file, configuration file, or the like) (hereinafter referred to as a registry) to map each device to a driver, at step 225. More specifically, for each device configuration data stored in memory, the operating system parses the registry to determine the device driver associated with the particular device. The device is specified by a device identifier, which uniquely identifies the physical device (e.g., product E from manufacturer B).

If the registry contains a mapping of the device driver to the particular device specified by the set of configuration data, the driver is loaded into the operating system, at step 230. As each driver is loaded, the operating system calls the drivers initialization code entry point and the driver completes the device-specific setup of the device.

However, if the registry does not contain a mapping between a particular set of configuration data and a device driver, the operating system will initiate an installation routine at step 240. The installation routing typically prompts the user to install a device driver, which is capable of enabling the particular device. Along with loading the device driver, the driver install routine also changes the registry to contain a mapping of the device to the applicable driver. Typically, the driver installation routine then causes the computer system to reboot to complete the install process. Thus, the startup process begins again at step 205

Figure 3:
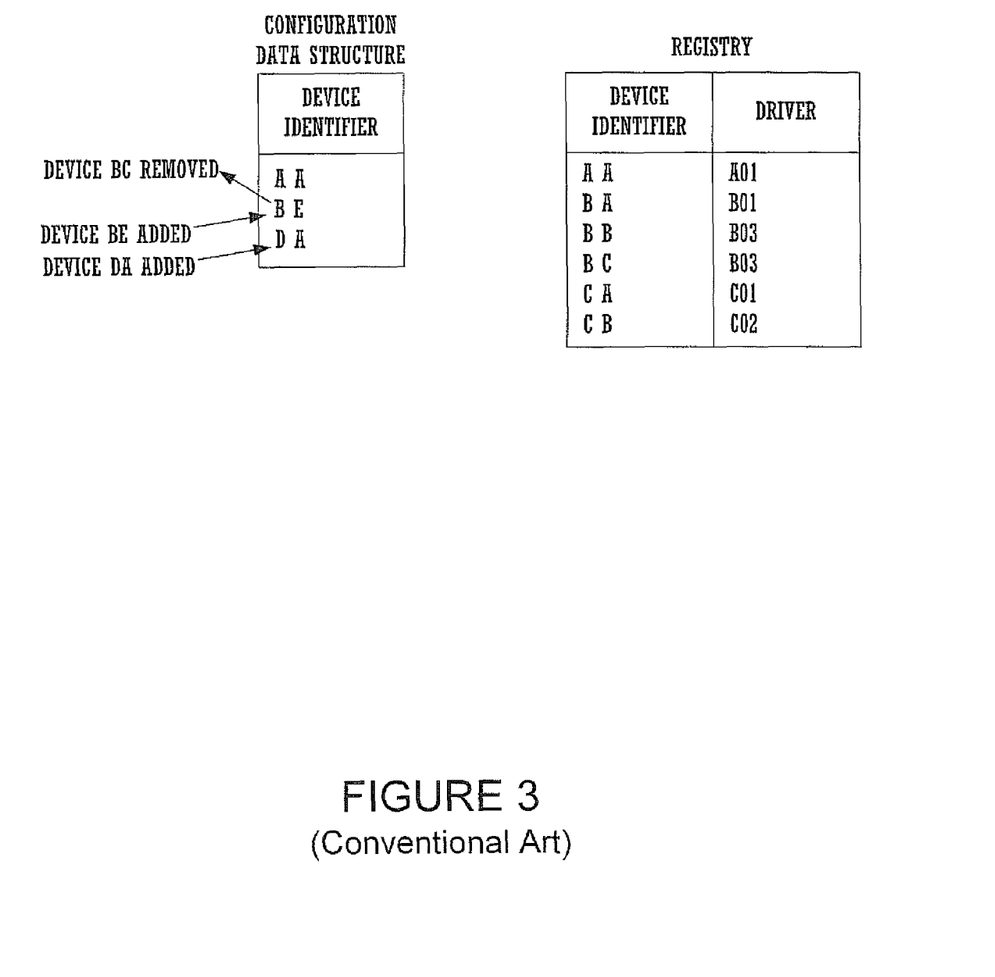
FIG. 3 shows an exemplary configuration data structure and registry according to the conventional art.

Referring now to FIG. 3, an exemplary configuration data structure and registry according to the conventional art is shown. As depicted in FIG. 3, previous installation of various drivers has resulted in the registry containing mappings between device identifiers AA, BA, BB, BC, CA, CB and drivers A01, B01, B03, B03, C01, CO2 respectively. Upon the next startup of the computer system, an enumerator routine finds device AA, BE, and DA.

Device AA has previously been installed in the system. Device AA contains a value of AA in its device identifier register. The registry contains a mapping between device identifier AA and driver A01. Therefore, the operating system will load driver A01 to control device AA.

Device BE has just been installed in place of an older version of the device (e.g., BC). Device BE contains a value of BE in its device identifier register. The registry contains mappings for the prior versions BA, BB, and BC of the device. Even if driver B03, which is present in the computer system, provides for control of device BE (e.g., backward compatible with driver B03), the operating system will initiate a driver installation routine. The driver install is required because there is no current mapping between the particular device identifier and any applicable driver.

Similarly, device DA has also just been installed in the computer system. Device DA contains a value of DA in its device identifier register. The registry, however, does not contain a mapping for device identifier DA. Thus, the operation system will initiate a driver installation routine.

In the conventional art, a unified driver can typically control the operation of number of devices, thereby providing backward and some forward compatibility. The prior generation of such a driver, however, only enables the functions in a new device that are common to the older generation devices of the same type. New functions that were not known at the time the driver was created will be unavailable. Furthermore, if the drivers are backward and forward compatible, a device can be controlled by any of such drivers.

Thus, a device can be associated with any number of related unified device drivers that supports sufficient operational functionality. However, the device configuration data does not currently provide a means for identifying unified drivers that are already loaded into the computer system and are capable of controlling the device. As a result, even if the computer system contains a unified driver (e.g., driver B03) that can control the device (e.g., device BE), the user must execute a set up routine to change the registry in order to relate the device identifier of such device to an existing unified driver.

SUMMARY OF THE INVENTION

There is a need for improving the process of initializing devices in a computer system, such that backward and forward compatible unified device drivers are associated with corresponding new devices, without having to initiate a driver installation routine. According to embodiments of the present invention, the operating system of a computer uses an initialization routine to send one or more queries to system and/or peripheral devices. In response to the query, the applicable device provides a device identifier that uniquely identifies an appropriate unified device driver. According to embodiment of the present invention, the device identifier is utilized to determine the applicable unifier device driver. According to embodiments of the present invention, the data may also include a revision identifier that uniquely identifiers the functions of the device to be supported by the driver.

According to embodiments of the present invention, the device identifier is not the physical device (e.g., revision of the piece of silicon comprising the device). The device identifier, instead, is an identifier of which device driver will work with which device. In one embodiment of the present invention, the value contained in one or more configuration registers identifies a base unified device driver. In one embodiment of the present invention, the base unified device driver comprises the oldest version of a device driver (e.g., software release) that will control sufficient functionality of the particular device (e.g., not all functions will work). The oldest version of the device driver is determined by testing the device utilizing the most recent version of an applicable driver, and then the next earlier version of the applicable driver, and so on, until an operation failure occurs. The previous non-failing driver thus is the oldest driver that will operate the device and is entered as the device identifier.

Embodiments of the present invention advantageously improve forward and backward compatibility of a unified driver architecture. Embodiments of the present invention are also advantageous in that the disk image (e.g., hard disk space containing the device drivers and the registry) only needs to be changed when a new driver is added, and not when a new PCI device is added. Embodiments of the present invention are also advantageous in that the use of a configuration data space and/or registry to map each device to a corresponding device driver is not necessary. By specifying a base unified device driver (e.g., vendor identification and the device identification), the operating system can load the applicable driver by directly reading the configuration register.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 4:
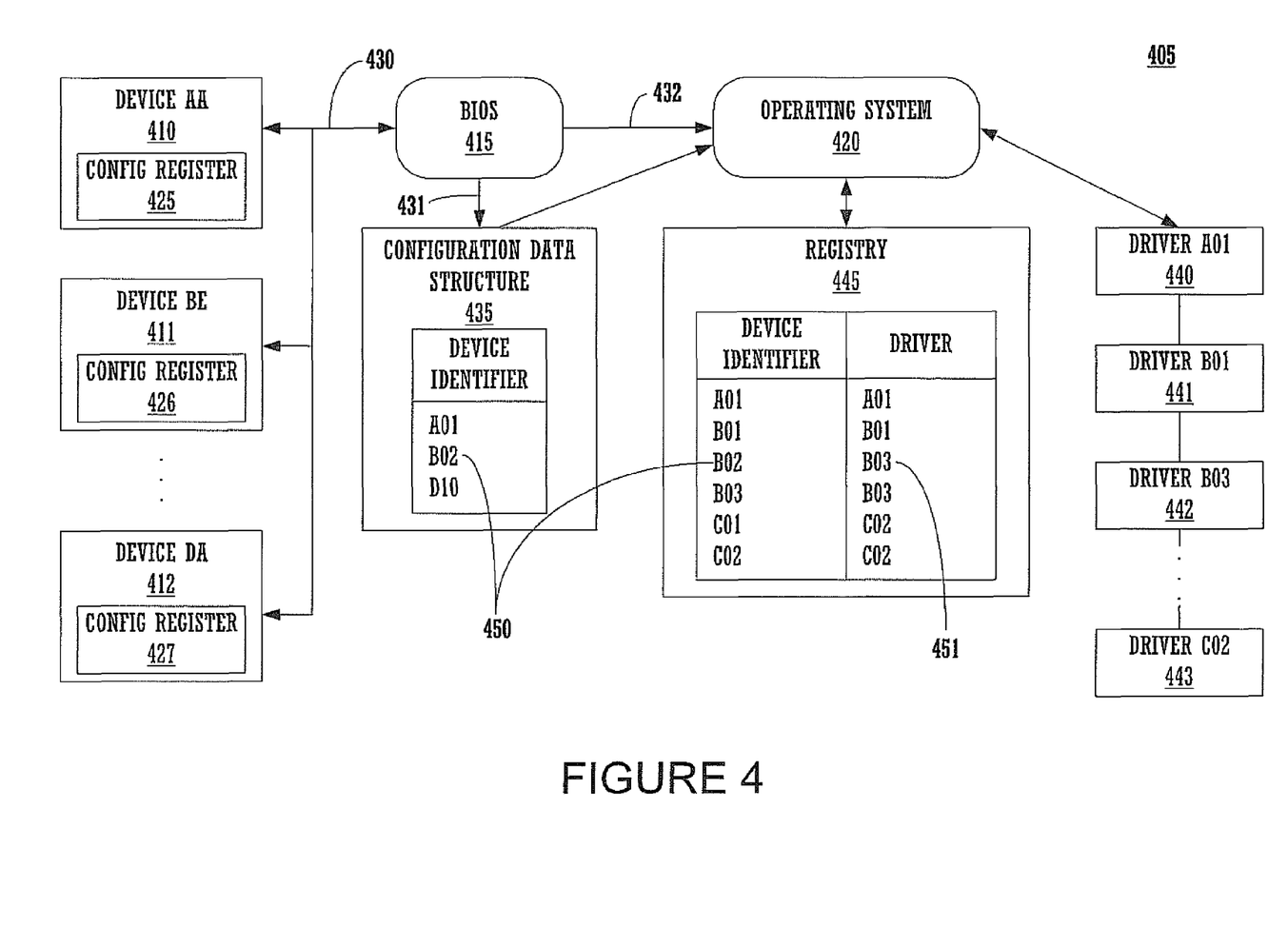
FIG. 4 shows a block diagram of a computer system during setup, in accordance with one embodiment of the present invention.

Referring now to FIG. 4, a block diagram of a computer system 405 during setup, in accordance with one embodiment of the present invention, is shown. As depicted in FIG. 4, the computer system 405 comprises a plurality of system and/or periphery devices 410-412, a basic input/output system (BIOS) 415, a configuration data structure 435, an operating system 420, a registry 445, and a plurality of drivers 440-443. The BIOS 415 comprises a first series of instructions (e.g., a set of software routines) utilized during startup of the computer system 405. The operating system 420 comprises a series of instructions utilized for controlling operation of the computer system 405 after startup.

Upon startup, the BIOS 415 sends a query 430 to each device 410-412. The query comprises a configuration data request. The configuration data request causes each device 410-412 to return the contents of a one or more configuration registers 425-427 contained in each device 410-412.

In one implementation, the configuration register 425-427 comprises a device identifier register. The device identifier specifies the oldest device driver that will control the device, as determined by testing of the device with a corresponding family of drivers. For example, performance of a device is tested, by the manufacturer of the device, utilizing the most recent version of an applicable driver, and then the next earlier version of the applicable driver, and so on, until an operational failure occurs. The previous non-failing driver thus is the oldest driver that will operate the device and is entered as the device identifier.

In another implementation, the configuration register may comprise a plurality of registers, such as vendor identification (Vendor ID), device identification (Device ID), revision identification (Revision ID) and the like. The Device ID register specifies the oldest device driver that will control the device (e.g., B03). The Vendor ID register specifies the manufacturer of the device (e.g. manufacturer B). The Revision ID register specifies the type of device (e.g., product E).

Thereafter, the BIOS 415 builds 431 a configuration data structure 435 in that lists the configuration data for each of the devices that were found. Hence, the configuration data structure 435 identifies all of the devices 410-412 that the operating system 420 has to work with. The BIOS 415 then causes the operating system 420 to begin execution. Upon startup of the operating system 420, the BIOS 415 passes control 432 along with a data pointer to the head of the configuration data structure 435.

The operating system 420 then selects and loads the appropriate driver 440-443 for each particular device 410-412. The operating system 420 utilizes a registry 445 to map each device 410-412 to an appropriate driver 440-442. For each device (e.g., 411), the operating system 420 utilizes the device's corresponding device identifier 450 to locate a device-specific driver 451 for the device 411.

Thereafter, the appropriate device drivers (e.g., 440, 442) are loaded into the operating system 420. Upon loading into the operating system 420, a driver initialization portion of the device driver code is executed to complete setup of the corresponding device (e.g., 410, 411).

If the registry 445 does not contain a mapping for a particular device identifier in the configuration data structure 435, the operating system 420 initiates an appropriate device driver installation routine.

Figure 5A:
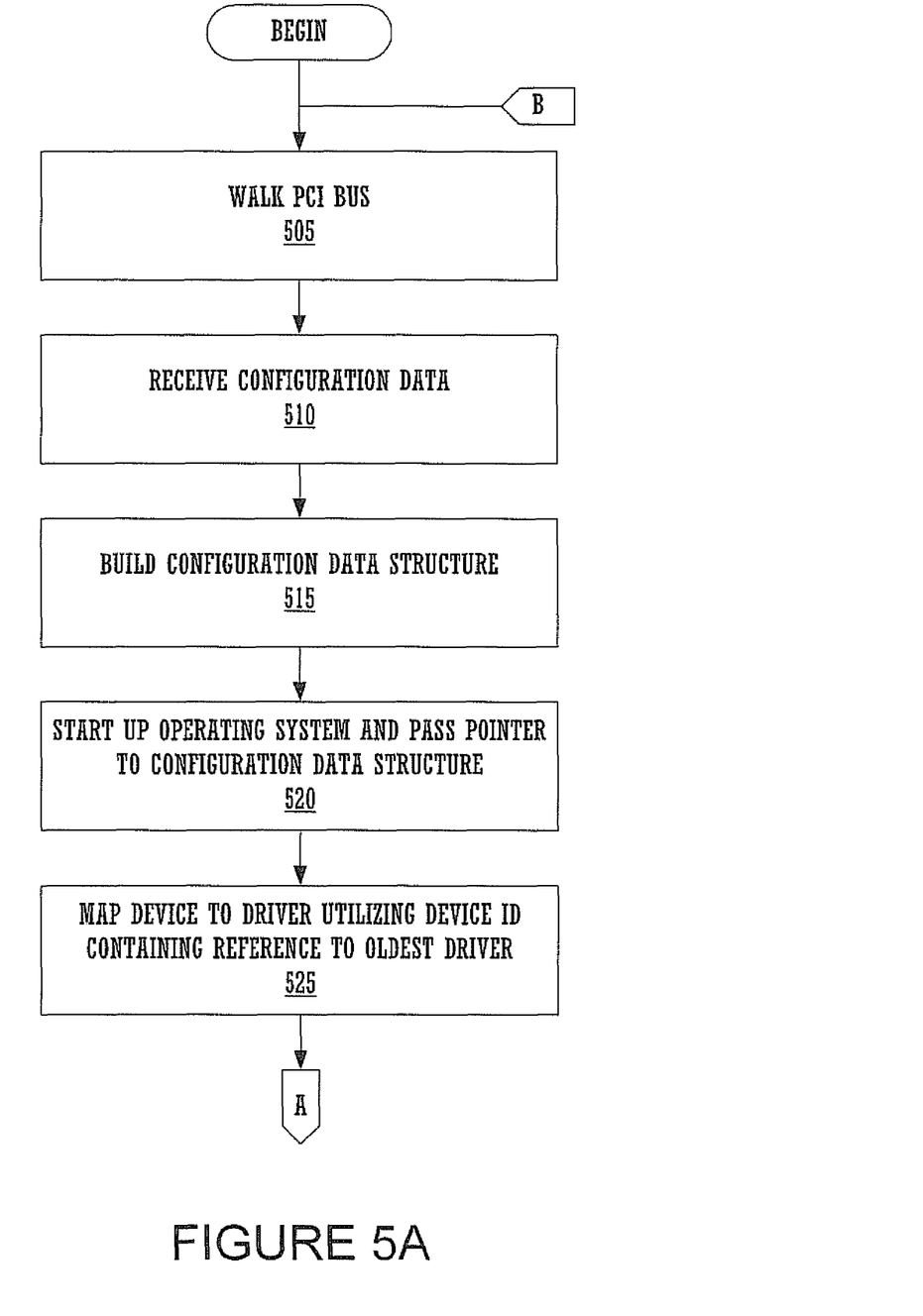
FIGS. 5A, 5B shows a flow diagram of a method of initializing one or more PCI devices, in accordance with an exemplary embodiment of the present invention.
Figure 5B:
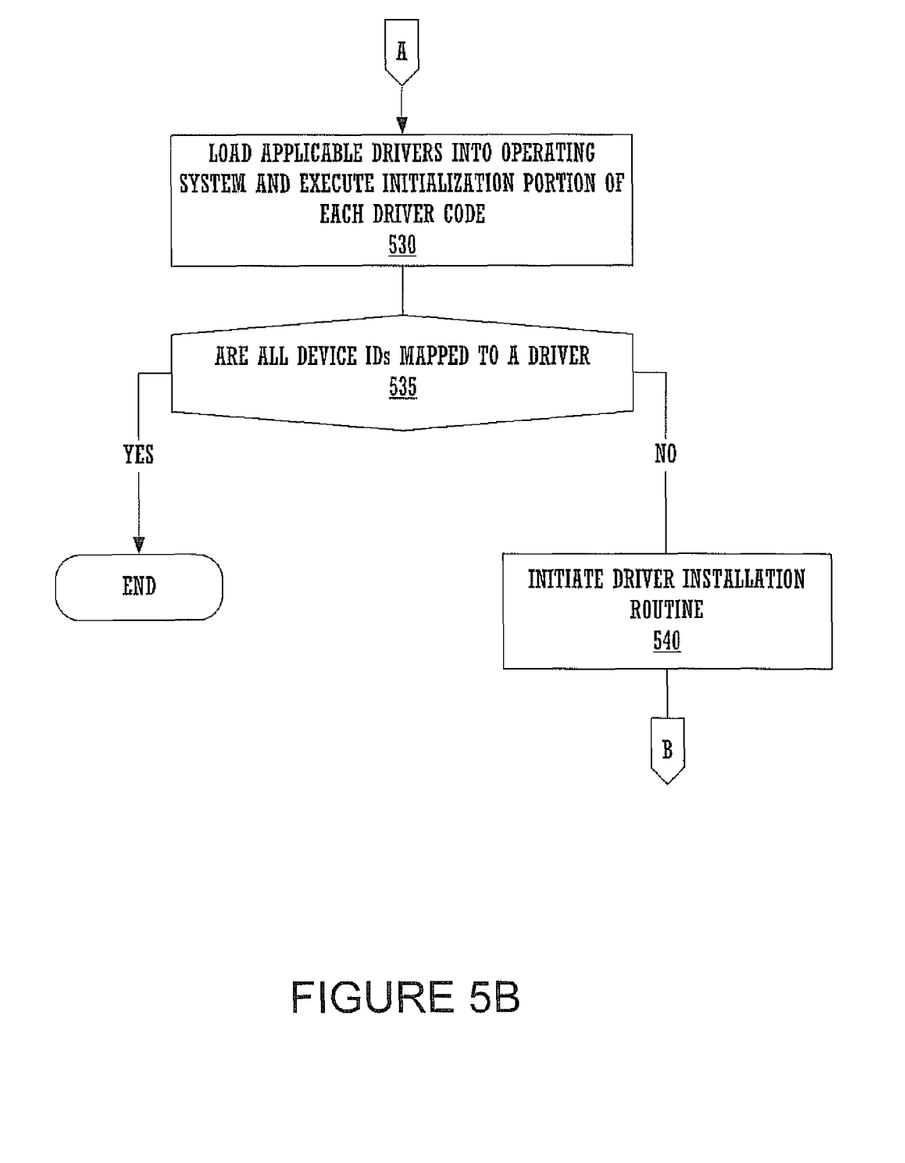

Referring now to FIGS. 5A, 5B, a flow diagram of a method of initializing one or more PCI devices, in accordance with an exemplary embodiment of the present invention, is shown. The process begins with a PCI enumerator routine walking a PCI bus to determine what PCI devices are present in the system and what configuration requirements they have, at step 505. In walking the PCI bus, the enumerator routine reads a subset of each device's configuration register.

Figure 6:
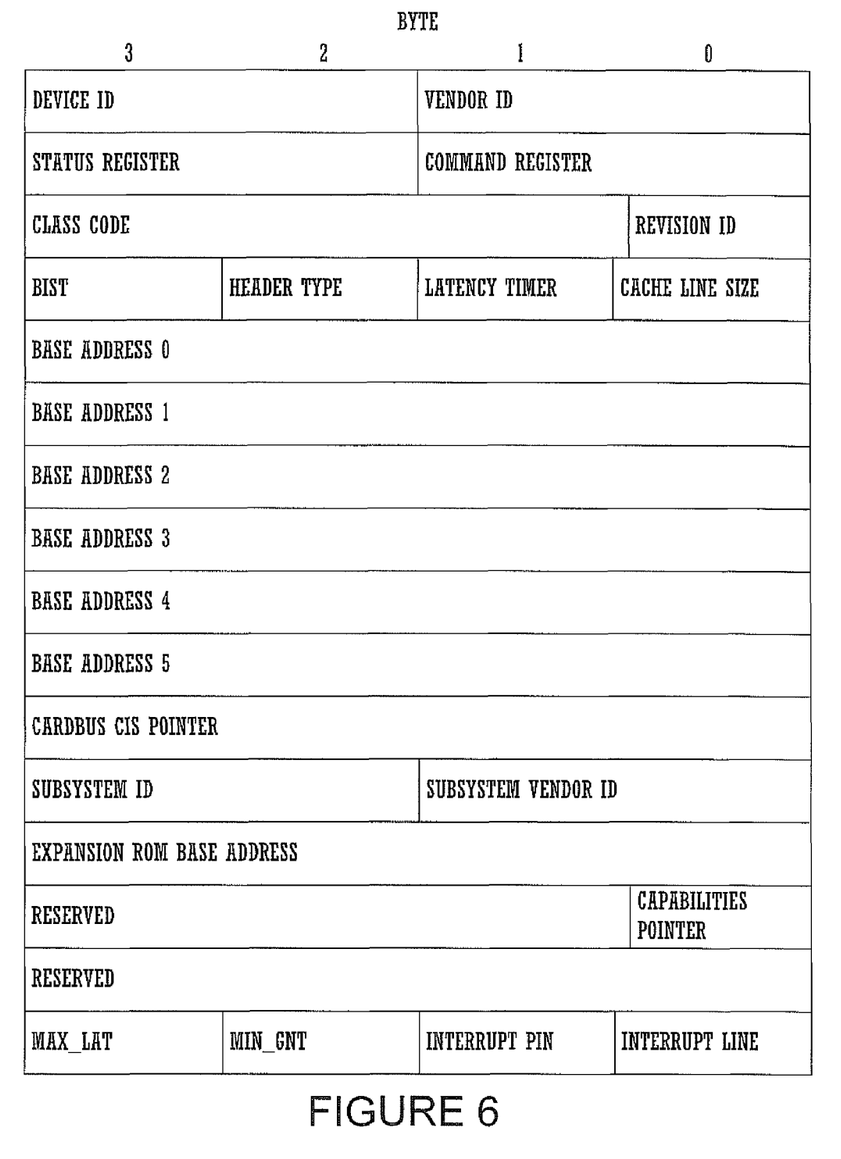
FIG. 6 shows a PCI device configuration register set according to the conventional in accordance with an exemplary embodiment of the present invention.

Referring now to FIG. 6, a PCI device configuration register set, in accordance with one embodiment of the present invention, is shown. The configuration register set comprises the following mandatory registers: Device ID, Vendor ID, Status Register, Command Register, Class Code, Revision ID, Header Type, Subsystem ID, and Subsystem Vendor ID. The other registers shown in FIG. 6 are optional.

The Device ID, Vendor ID and Revision ID are utilized in the present embodiment for loading an applicable device driver providing for control of a respective PCI device. The other registers are not germane to the present embodiment and therefore are not discussed further, so as not to unnecessarily obscure the inventive concept.

According to the conventional art, the Device ID is a 16-bit register that identifies the type of device (e.g., product C). The present embodiment utilizes the Device ID register to identify the PCI device by the functionality it provides. In one implementation, the Device ID register is set to the oldest version of a device driver (e.g., software release) that will control sufficient functionality of the particular PCI device (e.g., not all functions will work). In another implementation, the Device ID register is loaded with an identifier of a base unified driver, which will support sufficient functionality.

According to the conventional art, the vendor ID is a 16-bit register that identifies the manufacturer of the PCI device (e.g., manufacturer B). The present embodiment utilizes the contents of the Vendor ID and Device ID registers to uniquely identify a base unified device driver, which will support sufficient functionality for operation of the respective PCI device.

According to the conventional art, the Revision ID is a 16-bit register that identifies the revision number of the device. For example, if the vendor has supplied a revision-specific driver, the Revision ID can be utilized to ensure that the correct driver is loaded by the operating system (e.g., a driver to correct a bug). Optionally, the present embodiment utilizes the Revision ID to uniquely identify the PCI device (e.g., the particular functions of the PCI device to be supported by the driver).

Referring back to FIGS. 5A, 5B, the PCI bus enumerator receives a set of configuration data for each device attached to the PCI bus, at step 510. When the PCI bus enumerator has called all of the PCI devices in the computer system, the enumerator has a set of configuration data of each of the devices. The PCI bus enumerator builds a configuration data structure that lists the configuration data of all the PCI devices that were found, at step 515. The bus enumerator routine stores the configuration data structure in computer-readable memory.

The operating system is then started and a pointer to the configuration data structure is passed thereto, at step 520. The operating system utilizes a registry to map each device to a driver, at step 525. More specifically, for each set of device configuration data stored in the configuration data structure, the operating system parses the registry to determine the device driver associated with the particular configuration data. The device ID and vendor ID are utilized to select an applicable (e.g., device-specific) driver for the device. Optionally, the revision ID may also be utilized to select particular functions provided for by a selected driver.

For example, drivers A01, B01, B02, B03, C01 and C02 are loaded on the system and a newly installed device BE returns a Vendor ID of B and a Device ID of 02. For full functionality, device BE should have driver B05 associated with it. However, because the device returned B as its Vendor ID and 02 as its Device ID, the registry maps the device BE with driver B03, which is backward compatible with device BE. Driver B01 is not mapped with device BE, because the Device ID value of 02 indicates that the unified driver B01 is not forwards compatible with BE.

Thereafter, the applicable device driver is loaded into the operating system, at step 550. Any applicable driver, which is either forward or backward compatible with the particular device, can be loaded into the operating system. As each driver is loaded, the operating system executes the driver's initialization code portion of the driver to complete the device-specific setup of the device.

The method also determines if all Device IDs contained in the configuration data structure are mapped to a driver by the registry. If the computer system does not currently have a base driver that supports the installed PCI device, the installation routine can be initiated, whereby the disk image of the registry will be changed along with adding the driver. Upon installation of new drivers (e.g., the disk image is changed), the registry may also be updated so that every chip that is supported by the new driver will thereafter cross-reference the new driver.

Figure 7A:
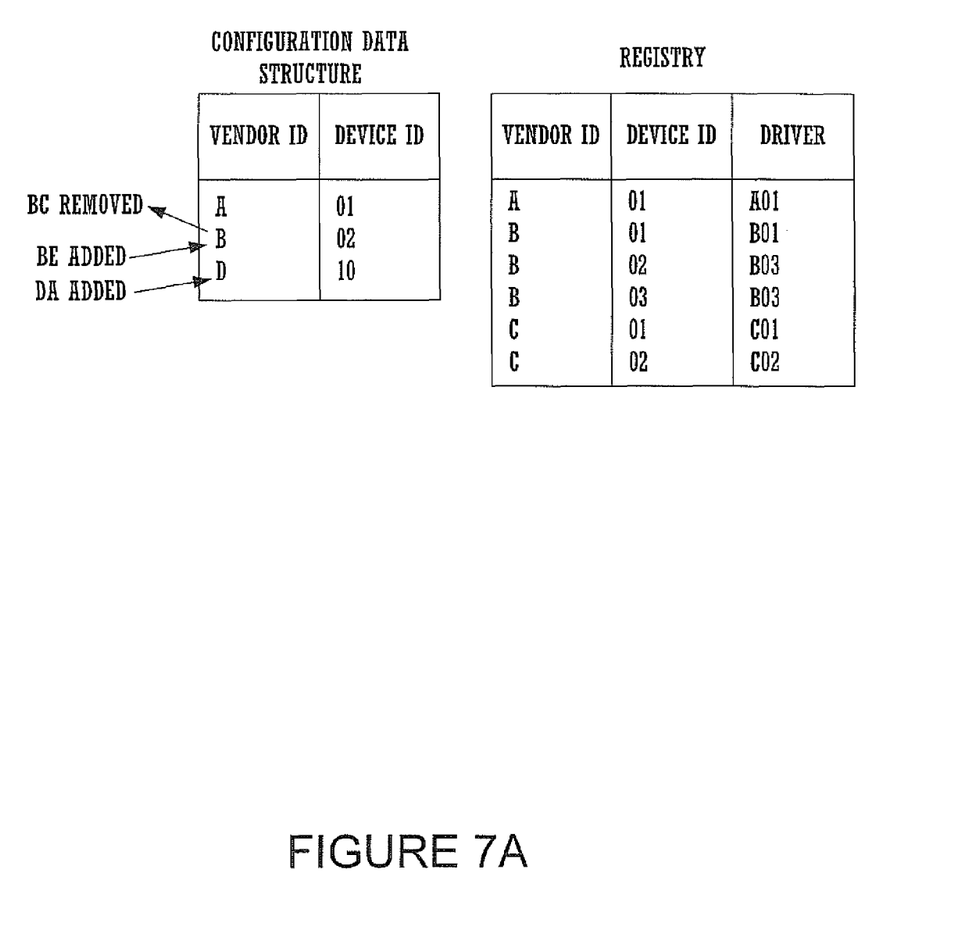
FIGS. 7A, 7B, 7C show an exemplary configuration data structure and registry, in accordance with one embodiment of the present invention.
Figure 7B:
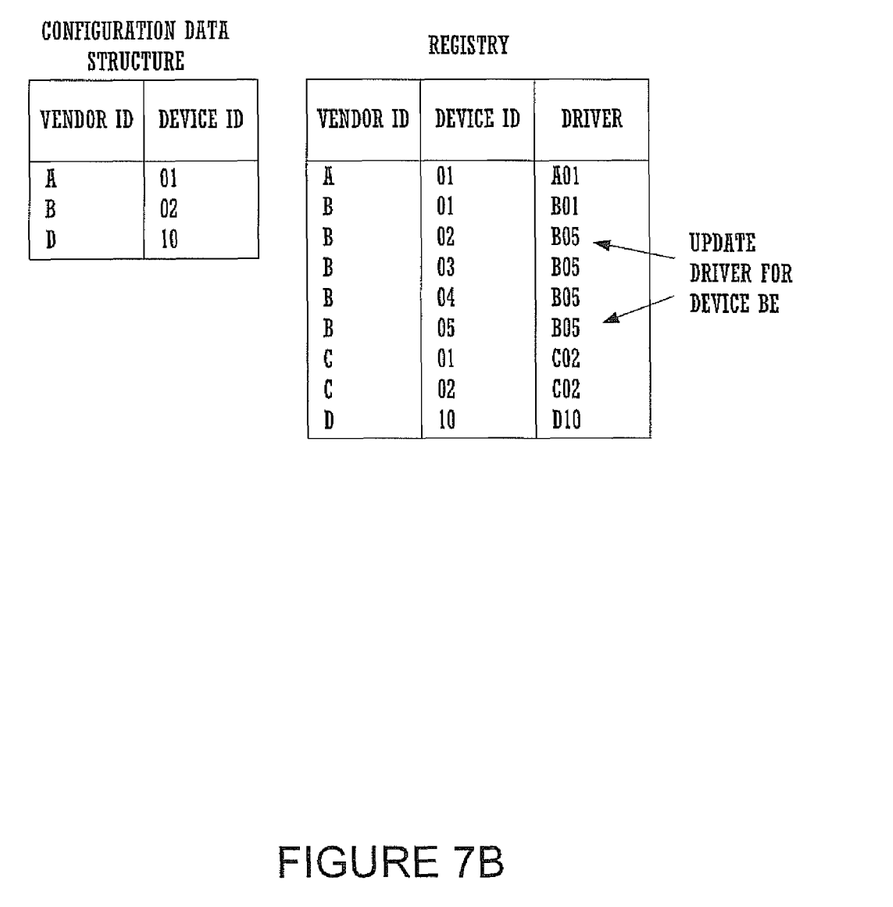
Figure 7C:
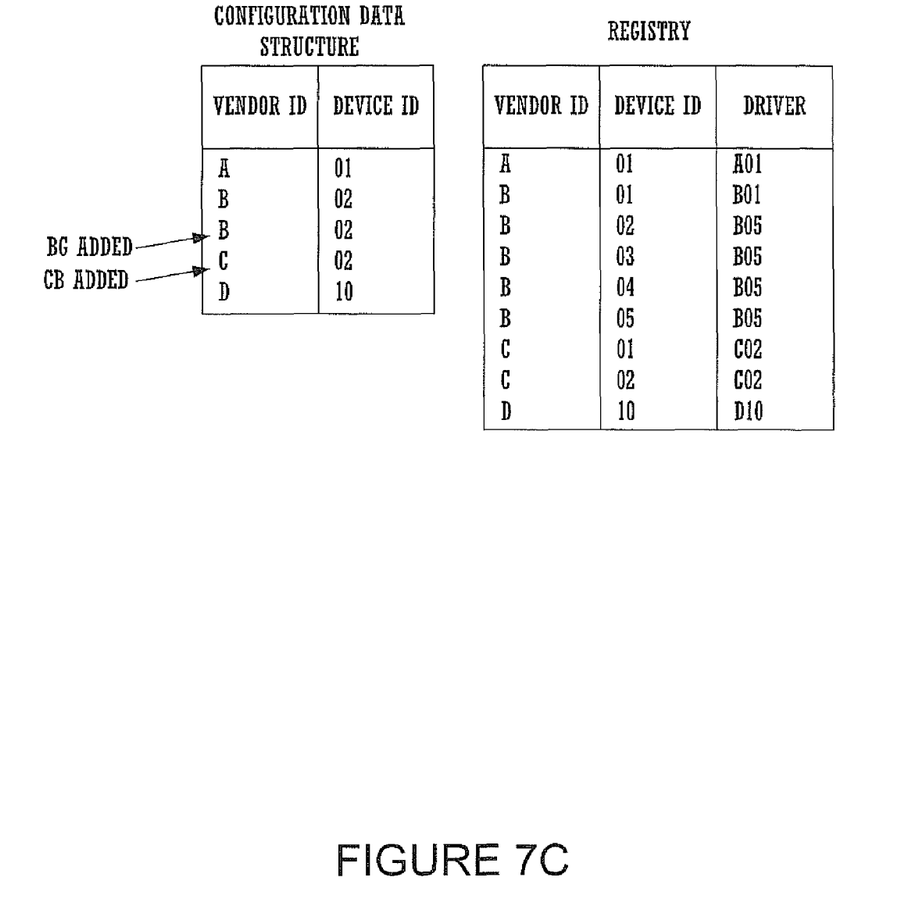

Referring now to FIGS. 7A-7C, an exemplary configuration data structure and registry, in accordance with one embodiment of the present invention, is shown. As depicted in FIG. 7A through FIG. 7C, the contents of the configuration data structure and registry change over time, In FIG. 7A, previous installation of various drivers have resulted in the registry containing a plurality of mappings between Device IDs and Vendor IDs and corresponding drivers. Upon the next startup of the computer system, the enumerator routine finds devices AA, BE, and DA.

Device AA (e.g., product A from manufacturer A) has previously been installed in the system. Driver A01 is the oldest driver that will provide for operation of device AA. Therefore, device AA contains a value of A in its Vendor ID register and 01 in its Device ID register. The registry contains a mapping of Vendor ID A and corresponding Device ID 01 to driver A01. Therefore, the operating system will load driver A01 to control device AA.

Device BE (e.g., product E from manufacturer B) has just been installed in place of an older version of the device (e.g., BC). Driver B02 is the oldest driver that will provide for operation of device BE. However, full functionality requires driver B05 to be installed. Therefore, device BE contains a value of B in its Vendor ID register and 02 in its Device ID register. The registry contains a mapping of Vendor ID B and corresponding Device ID 02 to driver B03. Therefore, the operating system will load driver B03 to control device BE. Thus, device BE will operate, although without all possible functionality, just like the older version of the device that it replaced. Furthermore, the operating system is able to locate a corresponding driver for device BE, and therefore a driver installation routine is not initiated.

Device DA (e.g., product A from manufacturer D) has also just been installed in the computer system. Driver D10 is the oldest driver that will provide for operation of the device DA. Therefore, device DA contains a value of D in its Vendor ID register and 10 in its Device ID register. The registry, however, does not contain a mapping for Vendor D and corresponding Device ID 10. Hence, the computer system does not contain an appropriate driver for device DA. Therefore, the operating system will initiate a driver installation routine. During the installation routing the registry is updated accordingly.

In FIG. 7B, a driver installation routine is executed, whereby driver B05 is added into the computer system. The driver install program knows all previous device/driver mappings and therefore updates the registry file to provide mappings for a number of devices and the newest driver that works with the devices. The installation routine thus updates the registry to map Vendor ID B and corresponding Device IDs 02, 03, 04, 05 to driver B05. The next time the computer systems is booted, therefore, device BE will have driver B05 providing control thereof.

In FIG. 7C, two additional devices, BG and CB, are added to the computer system. Driver CO2 is the oldest driver that will provide for operation of device CB. Therefore, device CB contains a value of C in its Vendor ID register and 02 in its Device ID register. The registry contains a pre-existing mapping of Vendor C and corresponding Device ID 02 to driver CO2. Therefore, the operating system will load driver CO2 to control device CB. As a result, the operating system does not initiate a driver installation routine.

Device BG contains a value of B in it Vendor ID register and 02 in its Device ID register. Driver B02 is the oldest driver that will provide for operation of device BG. Therefore, device BE contains a value of B in it Vendor ID register and 02 in its Device ID register. However, full functionality requires driver B07 to be installed. The registry contains a mapping of Vendor ID B and corresponding Device ID 02 to driver B05, as provided by the previously executed driver installation routine. Therefore, the operating system will load driver B05 to control device BG. The operating system is thus able to locate a corresponding driver for device BG, and therefore a driver installation routine is not initiated. In an optional implementation, the Revision ID (e.g., product E) may be utilized by the installed device driver B05 to determine the particular functionalities to be provided for in controlling device BE.

Embodiments of the present invention advantageously improve forward and backward compatibility of unified driver architecture for devices. The configuration registers (e.g., Vendor ID register and Device ID register) identify of the oldest version of the device driver (e.g., software release) that will control sufficient operational functionality of the particular device. The oldest version of the device driver comprises a base unified driver, which provides for immediate functionality of a device. Embodiments of the present invention are also advantageous in that the disk image (e.g., hard disk space containing the device drivers and the registry) only needs to change when a new driver is added, and not when a new PCI device is added.

Embodiments of the present invention are also advantageous in that the use of a configuration data space and/or registry to map each device to a corresponding device driver is not necessary. By specifying a base unified device driver (e.g., Vendor ID and the Device ID), the operating system can load the applicable driver by directly reading the configuration register.

The above descriptions and illustrations of the configuration data structure, registry, device identifier, Device ID, Vendor ID, and or the like do not represent the actual form and/or content thereof. For example, typically the configuration registers contain a hexadecimal code, which is converted to ASCII. The registry is typically in an ASCII format. The descriptions and illustrations are for illustrative purposes only, and were chosen so as not to unnecessarily obscure the inventive concepts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of initializing a device for use in a computer system, the method comprising:
    executing, by a processor, a version of a basic input/output system (BIOS) routine including,
        reading a device identifier (Device ID) register of a peripheral component interface (PCI) device containing a value that identifies an oldest version of a device driver for controlling the peripheral component interface (PCI) device, and saving the value that identifies an oldest version of a device driver for controlling the peripheral component interface (PCI) device read from the device identifier (Device ID) register as a device identifier in a configuration data space; and executing, by the processor, an operating system including,
retrieving the device identifier from the configuration data space, mapping the device identifier retrieved from the configuration data space to a device utilizing a registry, and executing an initialization routine of the device driver mapped to the device identifier by the registry.

2. The method according to claim 1, wherein executing an initialization routine of the device driver comprises configuring the driver to provide functionality supported by the device according to a revision identification contained in a revision identification register of the peripheral component interface (PCI) device.

3. A computer system comprising:
a peripheral component interface (PCI) device comprising a device identifier (Device ID) register containing a value that specifies an oldest version of a device driver for controlling the peripheral component interface (PCI) device;

a basic input/output system (BIOS) comprising a first series of instructions, in which the value that specifies an oldest version of a device driver for controlling the peripheral component interface (PCI) device is read from the device identifier (Device ID) register;

a configuration data structure, wherein the value that specifies an oldest version of a device driver for controlling the peripheral component interface (PCI) device is saved by said basic input/output system (BIOS);

a registry comprising a plurality of mappings between a set of device identifier values and a set of device drivers; and an operating system comprising a second series of instructions, wherein a device driver is loaded into the operating system according to the value that specifies an oldest version of a device driver for controlling the peripheral component interface (PCI) device saved in the configuration data structure and a corresponding one of the mappings.

4. A method of enabling a device in a computer system comprising:
executing, by a processor, reading a device identifier (Device ID) from a peripheral component interface (PCI) device that directly specifies a value that identifies an oldest version of a device driver for controlling the peripheral component interface (PCI) device; and saving the identifier of the oldest version of the device driver into a configuration data structure of the computer system, wherein the identifier is used by the computer system for selecting a proper device driver for the peripheral component interface (PCI) device.

5. The method according to claim 4, wherein the oldest version of the device driver is an oldest unified device driver providing for control of the peripheral component interface (PCI) device.

6. The method according to claim 4, further comprising loading the device driver into the computer system based upon the identifier of the oldest version of the device driver.

7. The method according to claim 4, further comprising:
mapping the identifier of the oldest version of the device driver in the configuration data structure to the device driver identifier in a registry; and loading the device driver into the computer system based upon the device driver identifier mapped to the identifier of the base unified device driver.

8. The method according to claim 4, further comprising:
reading a revision identifier from the peripheral component interface (PCI) device; and configuring the device driver to support functionality provided by the peripheral component interface (PCI) device according to the revision identifier.

9. A peripheral component interface (PCI) device for use in a computer system comprising:
a device identifier (Device ID) register containing a value that specifies an oldest version of a device driver for controlling the peripheral component interface (PCI) device.

10. A non-transitory computer-readable medium comprising instructions which when executed cause a computer system to implement a method of configuring a peripheral component interface (PCI) device, comprising:
receiving a value from a device identifier (Device ID) register of the peripheral component interface (PCI) device that specifies a value that identifies an oldest version of a device driver for controlling the peripheral component interface (PCI) device; and loading the oldest version of the device driver for use in configuring the peripheral component interface (PCI) device.

11. The non-transitory computer-readable medium according to claim 10, further comprising configuring the driver to support functionality provided by the periphery component interface (PCI) device according to the value of a revision identifier register of the peripheral component interface (PCI) device.

* * * * *